Aug. 3, 1943.  H. A. STRICKLAND  2,325,638
BILLET HEATING APPARATUS
Filed Sept. 19, 1941   9 Sheets-Sheet 1

INVENTOR
Harold A. Strickland, Jr.
BY John P. Tarbox
ATTORNEY

Aug. 3, 1943.   H. A. STRICKLAND   2,325,638
BILLET HEATING APPARATUS
Filed Sept. 19, 1941   9 Sheets-Sheet 5

INVENTOR
Harold A. Strickland, Jr.

BY John V. Tarbox
ATTORNEY

INVENTOR
Harold A. Strickland, Jr.
BY John P. Tarbox
ATTORNEY

Aug. 3, 1943.    H. A. STRICKLAND    2,325,638
BILLET HEATING APPARATUS
Filed Sept. 19, 1941    9 Sheets-Sheet 9

INVENTOR
Harold A. Strickland, Jr.
BY John P. Tarbox
ATTORNEY

Patented Aug. 3, 1943

2,325,638

UNITED STATES PATENT OFFICE 2,325,638

BILLET HEATING APPARATUS

Harold A. Strickland, Jr., Detroit, Mich., assignor to Budd Wheel Company, Philadelphia, Pa., a corporation of Pennsylvania Application September 19, 1941, Serial No. 411,452

12 Claims. (Cl. 219—13)

This invention relates to improvements in apparatus for heating bars or billets for use in subsequently forging desired articles therefrom, and particularly to induction heating apparatus. In such apparatus, the bar or billet stock is arranged within a coil supplied with high frequency alternating current of high voltage. Due to electromagnetic induction from the coil, heating currents are set up within the bar or billet stock which heat such stock to the desired forging temperature.

The primary aim of the present invention is to provide such an apparatus that is particularly adaptable for mass production of heated bars or billets wherein the bars or billets can be continuously and automatically fed to and through the heating chamber of the apparatus in desired sequence for desired periods of time, with the assurance that in event of abnormal disturbances in the operation from various causes the apparatus immediately and automatically shuts down its power to prevent overheating of bars or billets that may be in the apparatus, and to prevent breakage or injury to the various parts comprising the same.

Another aim of the invention is the provision of such apparatus that the apparatus can be easily operated without the use of highly skilled operators, and yet is of such construction that it is reliable and consistent in its operation.

A further aim of the invention is that of insurance that the apparatus cannot be operated without there being a supply of stock in the apparatus ready for heating, the apparatus and parts thereof being so designed and coordinated that the power is shut down in the event of failure in the supply of stock or in the event of some obstruction to the feed of the stock through the apparatus.

A still further aim of the invention is that of safety, all parts being insulated from contact by the operator, and certain of the parts having control apparatus associated therewith which functions to shut down the apparatus in the event of part failure.

Further aims are those of simplification to permit easy assembly and replacement of parts, and of efficiency in operation arising from the automatic control devices employed therein and the coordination of such control devices.

With the above and other objects in view which will be apparent, from the following detailed description, to those skilled in the art to which the invention appertains, the present invention consists in certain features of construction and combinations of parts to be hereinafter described with reference to the accompanying drawings, and then claimed.

In the drawings which illustrate a suitable embodiment of the invention.

Referring first to Figures 1 to 4, the general organization of the machine is upon and about an elongated base BA substantially of table height. On the top of this table is arranged in axial series, the billet feed end mechanism ED, the induction furnace NC and the billet delivery mechanism DL, the relative arrangement of which is such that billets are progressed from one to the other of these sections of the machine in series along an horizontal axis 20 (see Figure 4) and in the direction of the arrows applied to the axis. Within the base BA (see Figures 3 and 4) are located capacitors and various and sundry control elements which form sectional components of the control circuits of the machine, this group of control elements being generally designated KT. The vertical frame 21 and base BA is built of angle section members suitably secured together such as, for example, welding, to encompass suitable space for the capacitors and the control circuit group KT. The sides of the frame are closed by removable panels 22 which provide ready access to the elements of the control group KT and the capacitors. These elements are composed of various contactors, relays, flow meters, circuit breakers, etc. The top 23 of the table adjacent the inducing coils is comprised of heavy aluminum or other conducting bar or cast metal of a nature to shield the elements of the group KT from the relatively heavy magnetic field set up by the inducing coils of the furnace section NC. The table top under the portions DL and ED is made of steel. Panelling 22 is of steel and may be used for a similar purpose, but it need not be so heavy. The sturdiness of the top 23 enables it to better support the mechanisms which it carries.

The billet feeding mechanism ED, the furnace section NC and the delivery mechanism DL are all secured directly upon the top 23 of the base BA through suitable mounting devices, the feeding mechanism ED through the main frame 24 about which it is constructed, furnace coils NC by a series of mounting pedestals 25 and the delivery mechanism DL through its main frame 26.

The furnace section NC is the central portion of the machine and the major unit of the machine. It is made up of a number of longitudinally extending high-frequency induction heating coils 27 arranged in tandem on the common axis 20. In the present instance there are shown to be four of the coil sections 27 in the furnace unit NC. The number may be varied in accordance with the work to be done. The connection switch connecting them may be connected in series, parallel or other arrangement which may be found most desirable to suit the work and the conditions of heating.

Figure 1:
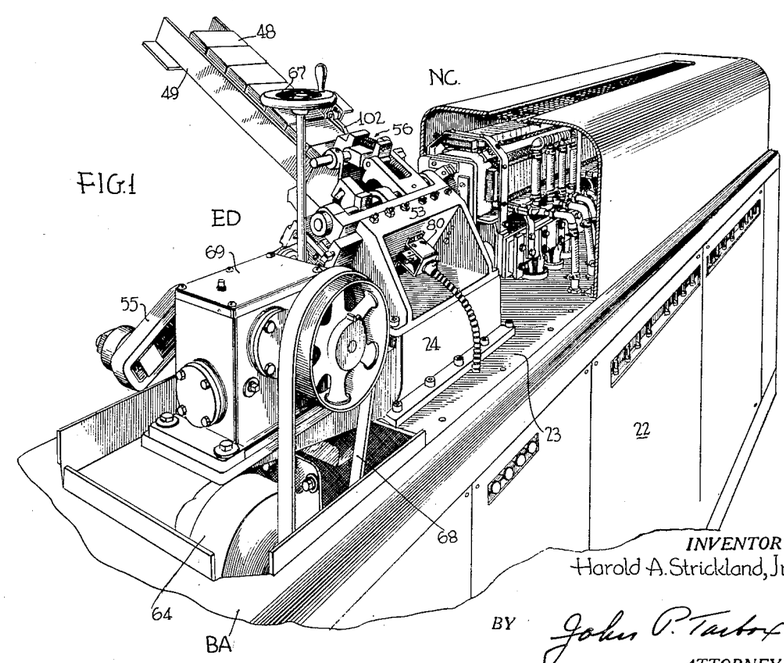
Figure 1 is a three-quarter top right perspective from the front of the machine, showing a portion of the hood removed.
Figure 2:
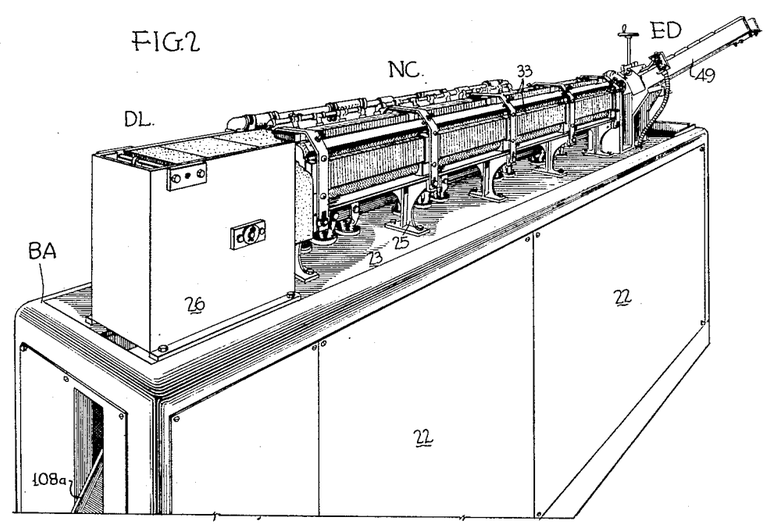
Figure 2 is a three-quarter top perspective from the left rear of the machine, with the hood removed.
Figure 3:
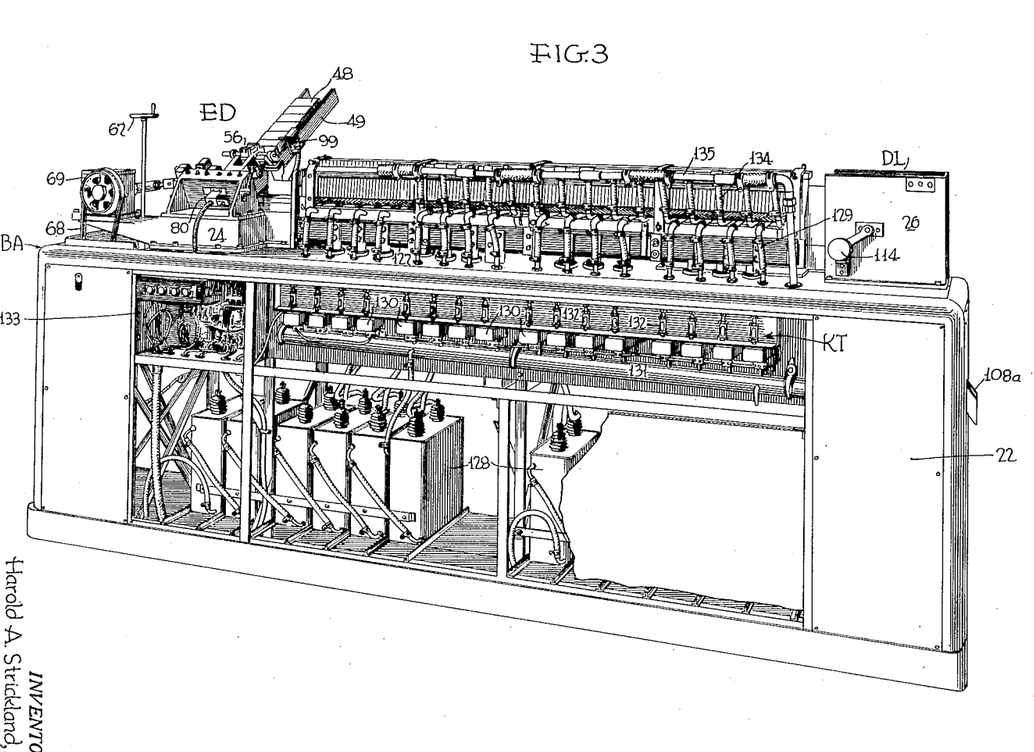
Figure 3 is a one-quarter perspective from the right rear of the machine, showing the machine not only with the hoods removed but with a portion of the panelling of the base removed to reveal the instrumentalities mounted within the base.
Figure 4:
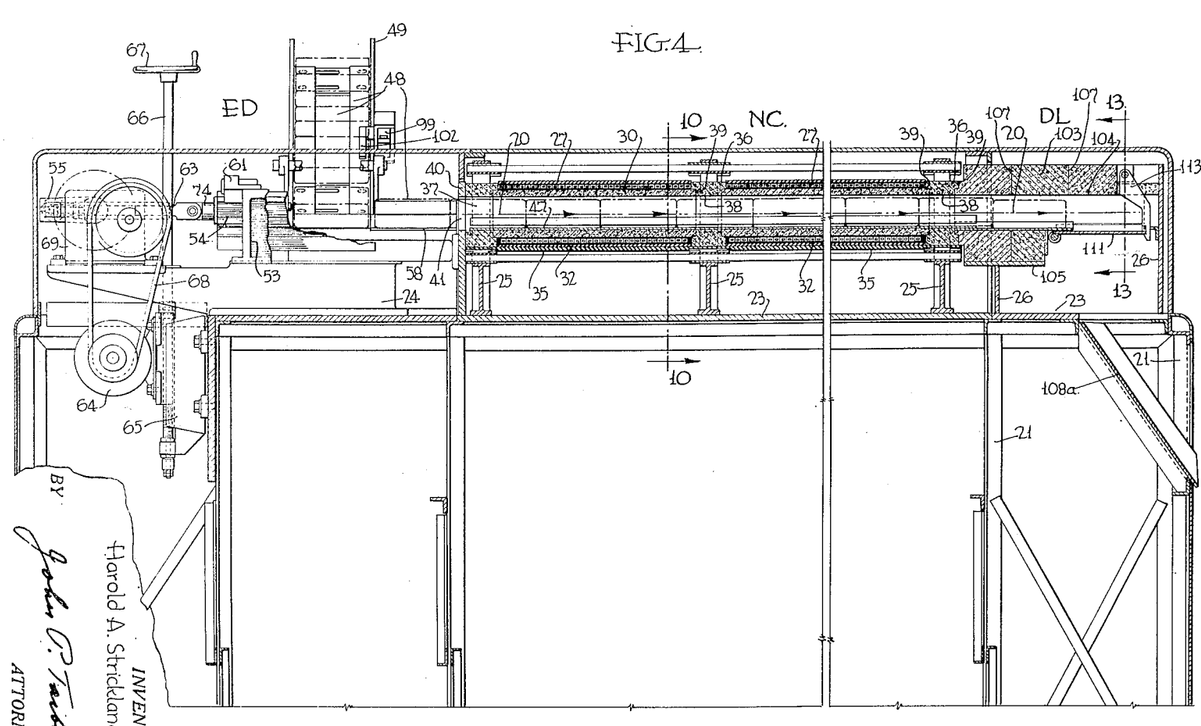
Figure 4 is a vertical longitudinal section of the machine.
Figure 10:
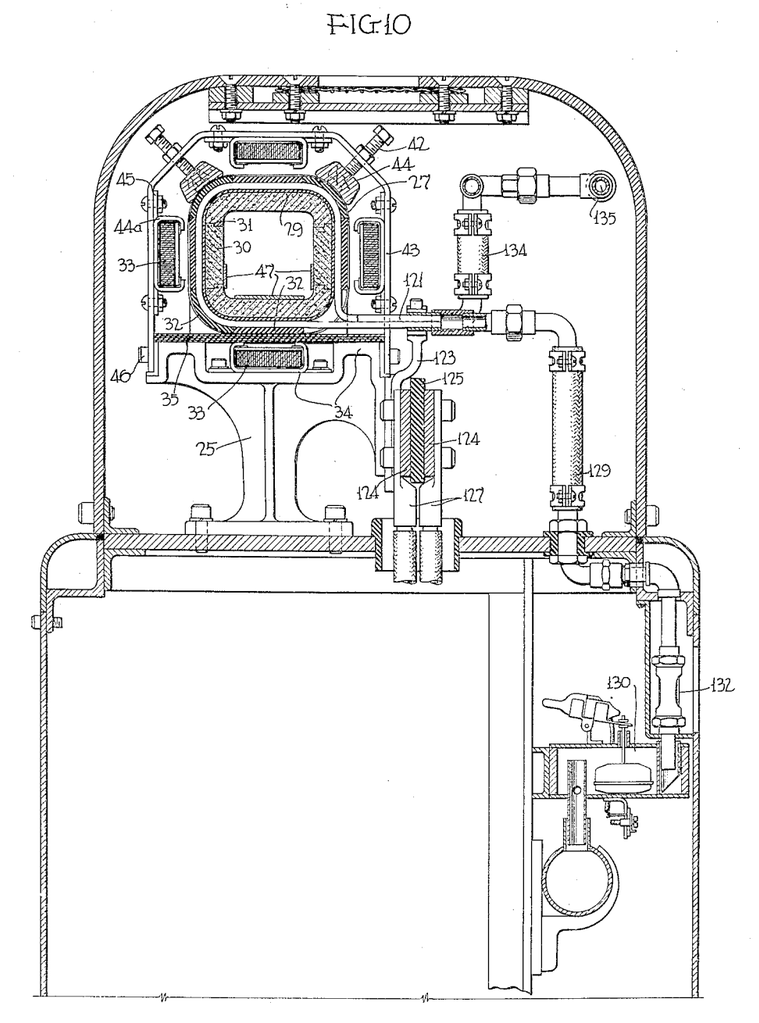
Figure 10 is a general transaxial section of the furnace portion of the machine taken approximately on line 10—10 of Figure 4, looking in the direction of the arrows.
Figure 11:
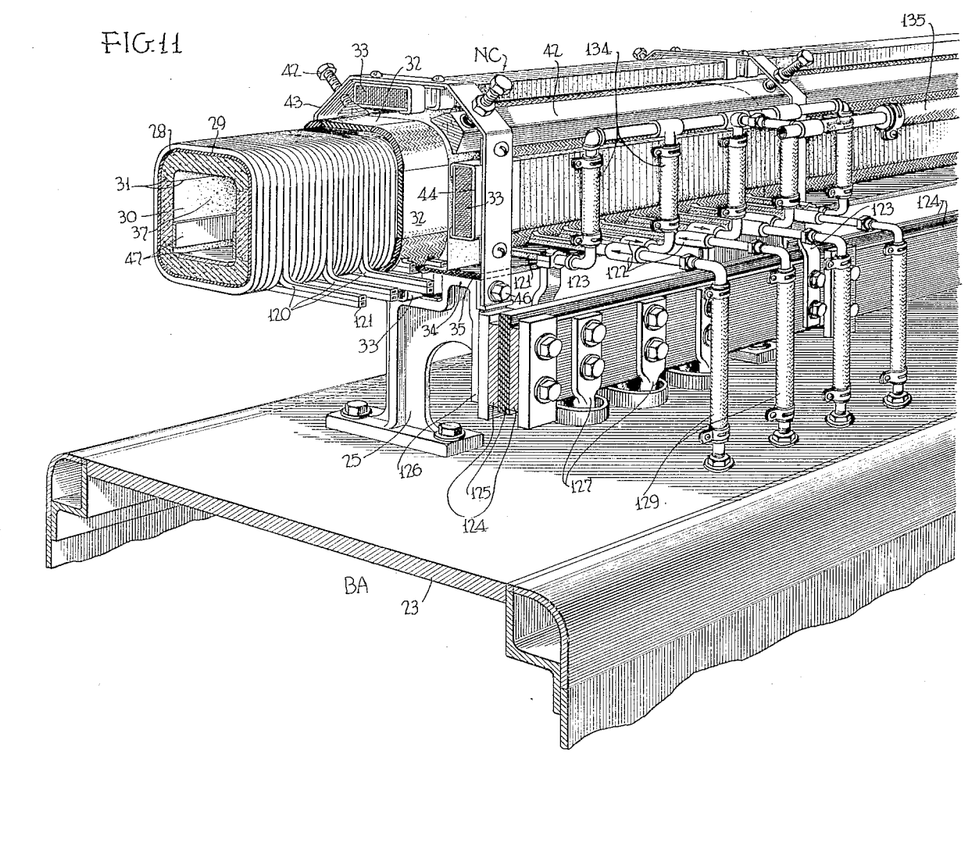
Figure 11 is an elongated three-quarter perspective from the front right of that portion of the furnace section of the machine in the neighborhood of the section of the line 10—10 on which the section 10 is taken, the fore part of the machine being broken away and the view terminating short of the rear portion of the machine.

Each coil 27 is similar in construction but not of necessity in the number of terms to each other coil section and, therefore, but one will be described in detail. Referring particularly to Figures 4, 10 and 11, and especially to Figures 10 and 11, it may be seen that each coil section is comprised of a coil per se 28 of turns having generally a rectangular form wound about a hollow body of insulating material 29 composed of mica or the equivalent or any other suitable insulation. Within this hollow body 29 is provided a sectionalized fire-brick lining 30 or equivalent heat insulating wall, the function of which is to prevent the heat of the billets produced by the induced coils from deteriorating the insulation 29, from unduly escaping from the billets themselves to promote thermal efficiency and from thereby overheating the coils 28. The sectionalization of the fire-brick lining 30 is along four lines 31 of interlocking form, as clearly appears in Figure 11, which lines transversely divide the longitudinally extending bricking 30 into similar top and bottom and similar side units for convenience in molding, installation and replacement. The coils outside are electrically insulated and moisture-proofed by longitudinally extending plates 32 of micarta or other appropriate insulation, the joints between which are suitably moisture-proofed. They may be taped in place. Of course, the turns of the coils themselves are appropriately insulated as they are wound.

On each of the four sides of the rectangular coils are arranged co-extensive bars 33 of laminated flux-conducting material for the purpose of jointly reducing the reluctance of the magnetic circuits of the coil and reducing the heating effect upon the enclosure. The laminations are in planes at right angles to the side of the coil opposite which bars 33 are placed.

These coil sections 27 of the furnace unit NC are supported end to end on the common axis 20 (see Figures 4, 10 and 11 especially) by means of the pedestals 25. These pedestals are bolted to the top 23 of the base BA, carrying on their tops 34 a transite plate 35 of heat and electrical insulating character extending from pedestal to pedestal continuously or in section. On top of this transite plate 35, in the transverse plane of the pedestal, each pedestal bears a fire-brick ring or loop 36 (Figure 4) centered about the axis 20 and providing an aperture 38 of the same size as the tunnel 37 formed by the fire-brick lining 30 for the coil units 27. The opposite end faces of the rings 36 are recessed, as at 39, to receive the ends of the fire-brick walls 30 of the coil sections 27 which are recessed on their inner edges. The outer end faces of the rings 36 (Figure 4) abut the ends of the coils 28 and the insulation thereof. The dimensions of the pedestals 25 transversely of the axis 20 are such that the outer insulation 32 of the coil units 27 also bears directly upon the transite plate 35, thus are the coil units 27 supported upon the pedestals 25 having their weight carried thereby and having their longitudinal spacing upon alignment about the axis 20 fixed thereby.

The units 27 are placed longitudinally on common base 35 in proper position. Their coils are all clamped against the base between the rings 36, with the endmost rings 36 bearing against the head plate 40, which is supported on base 23 at the front end of the furnace unit NC, and the front end of the delivery mechanism DL which conjoins the last of the rings 36. Head plate 40 contains an aperture 41 in line with the tunnel 37 comprised of fire-brick 30 and rings 36. From the endmost ring 36, this tunnel extends into the body of the delivery mechanism DL. Clamping screws 42 (Figures 10 and 11) carried at the upper corners of clamping straps 43, the ends of which are secured to the side of the pedestal 25, bear adjustably on the upper corners of coil units 27 through longitudinally extending strips 44 of insulating material such as impregnated wood, Bakelite or the like. The straps 43, constituting frames about the upper portions of the units 27, in addition to aligning and binding the units 27 in place, each support on their inner sides and between such sides and the coil sections 27, the bars 33 of the laminated material. This support is by means of metal clamps 44a bent about the laminations to bind them together and provided with ears 45 through which they are mounted upon the straps 43. The bars 33, about three sides of the coil sections 27, are self-supported, but the bottommost bar 33 is supported directly upon the top 34 of the pedestal 25, the top 34 being recessed in its mid-portion to provide space for this bar 33, namely, below the transite plate 34 and in the same spaced relation to the lower side of the coil section 27 as are the remaining bars 33 to the remaining sides of the coil section 27. This transverse organization of parts combined with the longitudinal organization of parts just now described permits of ready assembly and knock-down of the sections 27. Any section 27 may be readily removed from its place in the series which comprise the furnace unit NC, simply by loosening the clamping screws 42, loosening the securing screws or bolts 46 which secure the straps 43 to the pedestal 25, and removing the straps, and with them the connected bars 33, whereupon the desired coil section 27 can be removed. Both the head plate 40 and the delivery mechanism DL are axially movable for such purpose.

Within the tunnel 37 and appropriately secured to the fire-brick 30 are bottom and side work-slide strips 47 (see Figures 4, 10, and 11). These are preferably of strongly heat resisting and magnetic material, such as, for example, an appropriate stainless steel, which is also relatively proof against undue oxidation or corrosion due to the intense heat. The billets to be heated by the furnace unit NC slide on these rails and prevent contact of the billets with the fire-brick walls 30 and prevent what would be, if they were to contact, quick wearing out of these walls of the tunnel. These strips 47 are secured in place by any suitable means (not shown), preferably by means molded into the fire-brick and the strips may be in sections of a length equal to the length of the fire-brick within the several units respectively. The strips are clamped at the front end of furnace to the plate 40 and extend through the tunnel. They should be one piece. They are removed if a coil is removed.

The billets fed through the furnace unit NC are square preferably but not necessarily in cross-section and of elongated form, being cut from square cross sectioned bars. Batches of such billets designated 48, are shown sliding down chute 49 of the billet-feeding mechanism ED (see now Figures 1 to 3 and 5 to 9 especially). Because the billets are cut from long bars by shears, the ends are rough, as indicated by the irregular line 50 on the end of the billet appearing in Figure 6. The feed mechanism ED is given special characteristics, as will shortly appear, to cause these rough ends to be fed without disturbing operation of the machine. The function of the feed mechanism ED is to admit the billets 48 from chute 49, which is downwardly inclined toward axis 20, one at a time, to the feed mechanism ED and to push on the one admitted to the feeding mechanism and, through it, upon all others which lie in the machine on the axis 20 (and in full function there is a long line of them extending from the feed mechanism all the way along axis 20 to the delivery mechanism DL) to move the line of billets 48 through the machine and cause the endmost one in the delivery mechanism DL to be delivered from the machine by way of the delivery chute 51. Upon delivery it may be manually transported to the dies of a forging machine or any suitable conveyor means be utilized automatically so to transport.

Figures 7, 9:
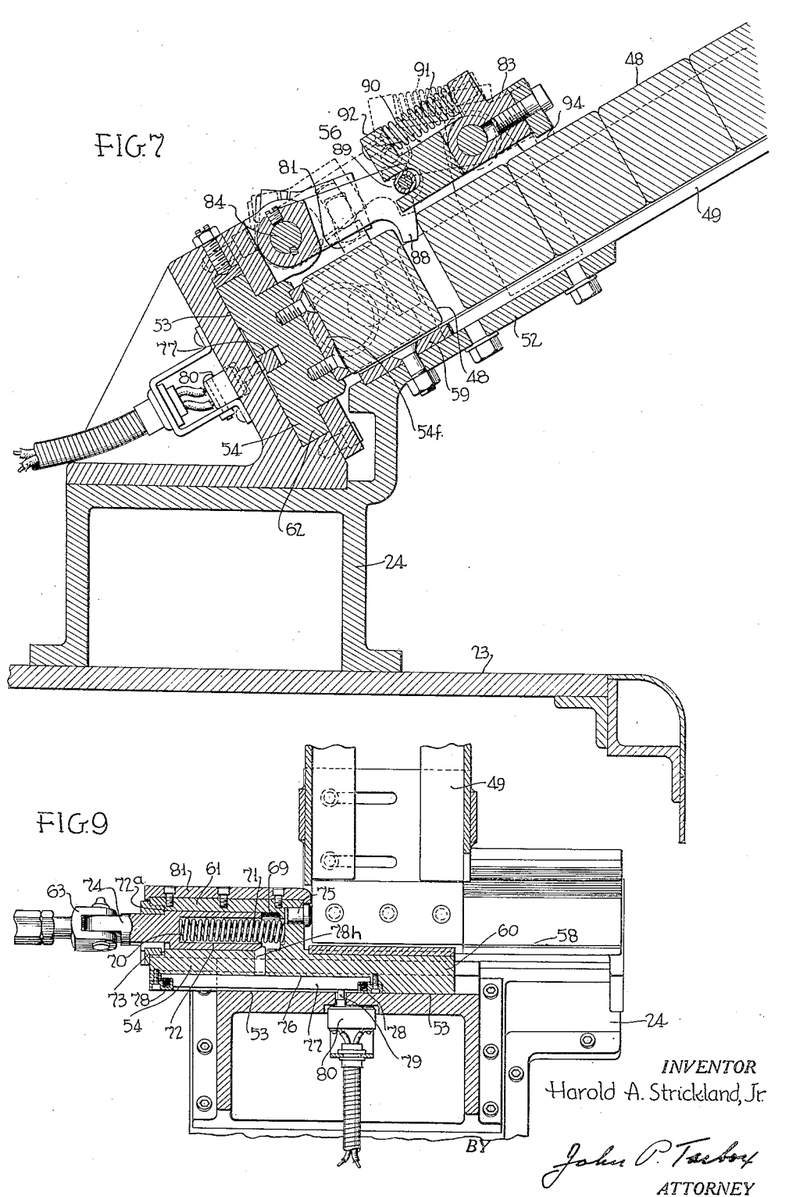
Figure 7 is a transverse section on line 7—7 of Figure 5 looking in the direction of the arrows, being in general a vertical central section of that portion of the mechanism shown in Figure 6.
Figure 9 is a partial horizontally directed section on the line 9—9 of Figure 6.

The feed mechanism ED is comprised of the frame 24, aforementioned, by means of which it is mounted upon and supported from the table 23 of the machine, the chute 49 which is supported from one side of the frame 24 by an angular extension 52 to which it is removably bolted, as shown in Figure 7, a feed bed 53 removably mounted on top of frame 24, a motor-driven feed plunger 54 deriving reciprocatory motion from a crank arm 55, and an escapement 56 which is operated through the reciprocatory movement of plunger 54 to feed but one billet 48 to the machine at a time.

Bed 53 and plunger 54 lie at an angle to the horizontal plane of the bottom of the tunnel 37 of the furnace unit NC, preferably at the same angle as does the gravity feed chute 49. They are of a length greater than the length of chute 49, and, of course, longer than the length of the longest billet 48 to be fed transversely of its length through chute 49. The advance end of the bed is spaced from the head plate 40 marking the entrance to tunnel 37 (see especially Figures 4 and 5) by a distance a fraction greater than the length of a billet 48. (Note the billet 48 shown in dotted lines in the plan view of Figure 5.) This space is bridged by a receiving platform 58 whose receiving face (see Figure 4) lies in the plane of the bottom of the tunnel 37, as defined by the bottommost rail strip 47. Platform 58 may be cast integrally with the bed plate 53 or frame 24 or separately connected therewith, as may be preferred. The head plate 40 may be separably connected with platform 58, if desired. Such arrangements are optional and various. Thus, a billet pushed forward from the lower or discharge end of chute 49 may be pushed clear of the leading edge of the bed plate 54 and fall angularly clock-wise (as viewed in Figure 6) upon the platform 58 with its center in alignment with the axis 20. This end bed 53 and the plunger 54 are arranged laterally somewhat to the right of axis 20.

However, billets 48 are not received directly upon bed 53, but always upon the outer face of platform 58, which is provided with a removable wear plate to constitute its outer face. The discharge end of the chute 49 is also provided with a removable wear plate 59 against which the adjoining lower side of the billet 48 may rest during the feeding movement. Plunger 54 is in the form of an L, the main branch 60 of which adjoins the bed 53, and the base 61 of which extends at right angles upwardly and against the end of a billet 48 discharged from the lower end of chute 49.

Plunger 54 is supported slidably in gibs 62 (see Figures 7 to 9) on the face of bed plate 53 and receives billet 48 in the angles of its branches 60 and 61. When reciprocated in its forward movement, its base portion 61 engages the rear end of a billet 48 and shoves it past the escapement mechanism 56 and past the advance end of plate 59 and the advance end of bed plate 53, beyond the advance side of the chute 49 to a position laterally juxtaposed to the platform 58, to which it descends the moment plunger 54 starts on its return stroke, thereby relieving pressure upon its end, turning angularly clock-wise to rest flatly upon platform 58. The advance end of such billet 48 during the advance stroke of plunger 54, as has been said, engages the rear end of the rearmost billet of the train which lies on the platform 58 and in the tunnel 37. This engagement is to the right of the axis 20, as one can clearly see on inspection of the end projections of the two billets 48 shown in Figure 6, respectively, in full and dotted lines, the former representing the billet being discharged by the feeding mechanism ED, the latter the rearmost billet 48 of the train lying upon platform 58. Due to the roughened ends of the billets (symbolically designated by the line 50) and the feeding pressure, the billet 48 being discharged from the mechanism ED is retained in its inclined position and in said contact with the endmost billets of the train being fed until the plunger starts on its return stroke and relieves the pressure upon it. When it falls on platform 58 it is prevented from displacement to the left of the platform by the vertical side wall 62 of this platform, which side wall lies in the same plane as the left-hand side wall track of the tunnel 37. It is prevented from rebounding to the right by the receding plunger whose face 54f, at its lower edge, is spaced from the side wall 62 approximately by the width of the billet 48.

Plunger 54 is connected with the crank 55 of the motor drive mechanism by a connecting rod 63 having an adjustable length by reason of its embodiment in turn-buckle form. Crank 55, itself, is of an adjustable length, as appears in Figure 1, whereby the stroke of the plunger may be adjusted. Motor drive mechanism consists of driving motor 64 housed in base BA and being vertically adjustable on a slide mechanism 65 by means of a screw and shaft 66 operable from hand wheel 67; a variable-speed belt drive 68 extending upwardly from the motor and a speed-reducing gear 69 which drives crank 55 directly. The variable-speed drive may take any other of a number of different forms and, indeed, there may be provided any number of means of varying the speed by the need of the plunger 54.

Figure 8:
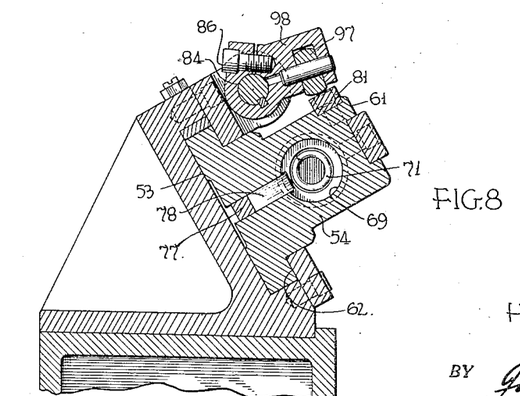
Figure 8 is a transaxial section on line 8—8 of Figure 5, looking in the direction of the arrows.

Plunger 54, moreover, is of special construction, as most clearly appears in Figures 8 and 9. The base portion 61 is hollowed out to form a chamber 69 receiving a rearwardly spring-pressed connecting pin 70 to which connecting rod 63 is swivelly connected. Spring 71 bears at its fixed end against the closed end wall of the chamber 69 and its rear end is housed in a hollow 72 of the pin 70. The inner end of the pin 70 is shouldered at 72a and this shouldered portion is confined within the chamber 69 by a removable head 73 which surrounds the outer end 74 of pin 73 and closes the chamber 69. The length of the shouldered portion of pin 70 is less than the length of chamber 69, whereby under the thrust of connecting rod 63 a yielding push is provided by spring 71 upon the plunger 54 preventing jamming of the bars in the presence of any undue obstruction due to the sliding of the billets being fed past the feed trough 49 and its contacted billets or to obstruction anywhere along the train of billets being fed and the pathway along which the train progresses. A specially hardened push-pin 75 is provided in the pushing face of plunger 54 to engage the billets. On the under side of the plunger is provided a slot 76 which houses a small pawl 77 pressed by springs 78 at its opposite ends. This pawl is depressed whenever the feeding pressure required for the billets exceeds that required to compress spring 71 a pre-determined amount. The depression is achieved through a pin 78h passing through the body of plunger 54 transversely from the approximate center of pawl 77 toward the inner end of the connecting pin 70 at which point it effects a cam engagement with pin 70. Pawl 77, in turn, through a pin connection 79, operates a circuit-breaker 80 the purpose of which is to give an electric signal (functioning for purposes presently to be described) whenever the pressure required for heating is excessive. This signal, if desired, may be utilized to cut off the electric power from the feeding motor 64, and also to cut off the supply of current to the heating coils.

Figure 5:
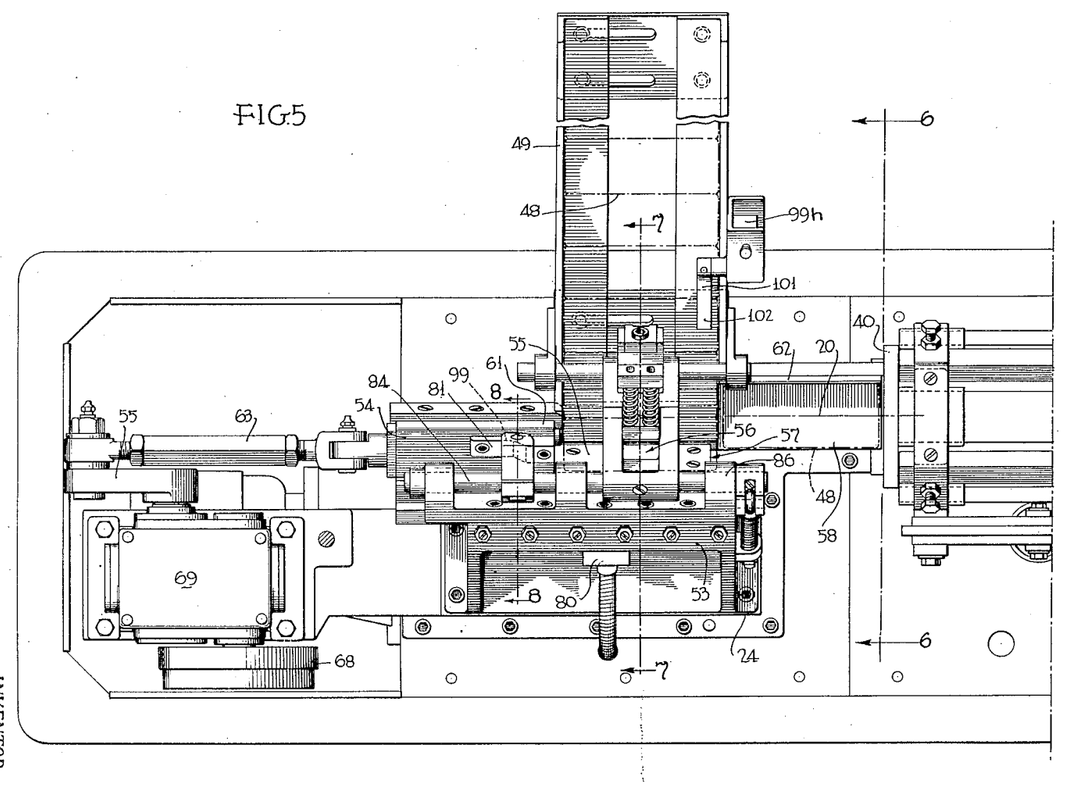
Figure 5 is a top plan view of the billet-feeding inlet.

On top of portion 61 of plunger 54 is mounted a removable and adjustable cam member 81 for operating the escapement mechanism 56 (see now especially Figures 5 to 8) which comprises a co-acting billet-spacing pawl 82, and a billet-braking or stop pawl 83 mounted respectively upon spaced parallel shafts 84 and 85 and respectively supported in bearings, the one by bearings 86 from bed member 53 and the other by bearings 87 from the sides of chute 49. Billet-spacing pawl 82 is keyed to its shaft 84 to be oscillated thereby from an upper position free of billets 48 (see dotted line position of Figure 7) to a lower position in which its billet-engaging tooth 88 separates an advance billet fed against the plunger face 54f from the next succeeding billet, bearing from the front face of tooth 88 against the upper edge of the next succeeding billet and stopping from dropping against the billet lying upon the plunger face 54f. The forward end of the pawl 82 in the neighborhood of the tooth 88 has a pin and slot connection 89 with the rear end of a crank arm 90, journalled loosely upon the shaft 85 and mounted on this shaft individually of the pawl 83. However, a spring driving connection 91 is provided between the angle 92 of arm 90 and the angle 93 of pawl 83, whereby clockwise movement of the arm 90 about shaft 85 yieldingly drives pawl 83 downwardly to yieldingly engage its wear-resistant face 94 with the top of the third billet from the plunger 54 in the chute 49, thus preventing the third billet from moving when the second billet is released by movement of the pawl 82 upwardly and permitting the second billet to move into the position of the first, after the first has been fed to the platform 58 and plunger 54 has receded. At this period of operation, the pawl 82 pivots downwardly to the position shown in solid outline in Figure 7 causing the arm 90 to likewise move downwardly and in turn as a result of the spring connection 91 to raise pawl 83 upwardly to relieve the third billet of stop or brake action of the pawl 83 and thereby permit it to move to the position previously occupied by the second billet. The pawls are actuated by oscillation of shaft 84 against the pressure of a spring 95 having one end engaging the arm 96 of shaft 84, and shaft 84 is oscillated by means of a follower roller 97, which engages the cam 81, previously described as being mounted on the upper face of plunger 54, the follower roller 97 being journalled on the outer end of an arm 98, keyed and clamped to shaft 84. The escapement mechanism 56 described, is made to operate precisely at the right point of the stroke of the plunger 54. Reference to Figure 5 shows that cam 81 is provided with an abruptly angled face 99 intermediate its ends. When the follower roller 97, during the return movement of plunger 54, rides from the lower portion of the cam 81 over face 99 to the higher portions, shaft 84 is operated counterclockwise to lift pawl 82 to its upper dotted line position releasing the second billet (see Figures 6 and 7) which slides downwardly into the position formerly occupied by the first billet (now upon the platform 58) prior to such release; however, operating movement of the arm 90 through the pin and slot connection 89 has effected a yielding pressure on pawl 83 to engage the third billet through the medium of the face 94. The receding stroke of plunger 54 having been finished, and its forward stroke commenced, roller 97 rolls down the incline of cam 81 to the lower level operating shaft 84 as viewed from the head end of the machine (continue to note Figure 5), and this movement (now referring to Figure 7) carries the pawl 82 and its tooth 88 downwardly and substantially at the same time causes pawl 83 to release the third billet and permit it to slide downwardly into the position previously occupied by the second billet against the front face of the tooth 88, thereby also releasing all billets above it in the chute 49. The tooth 88 prevents the billet engaged therewith from reaching the side of the billet now resting upon the face 54f and being fed to platform 58. The tooth 88 does not engage the near side of the billet being fed, and, although the parts are mentioned in the singular, it will be noted that they are actually provided in pairs in order to attain stability of the billets being fed. Yet, they might very appropriately be considered as but a unit of sufficient width to attain stability of the billets.

Figure 6:
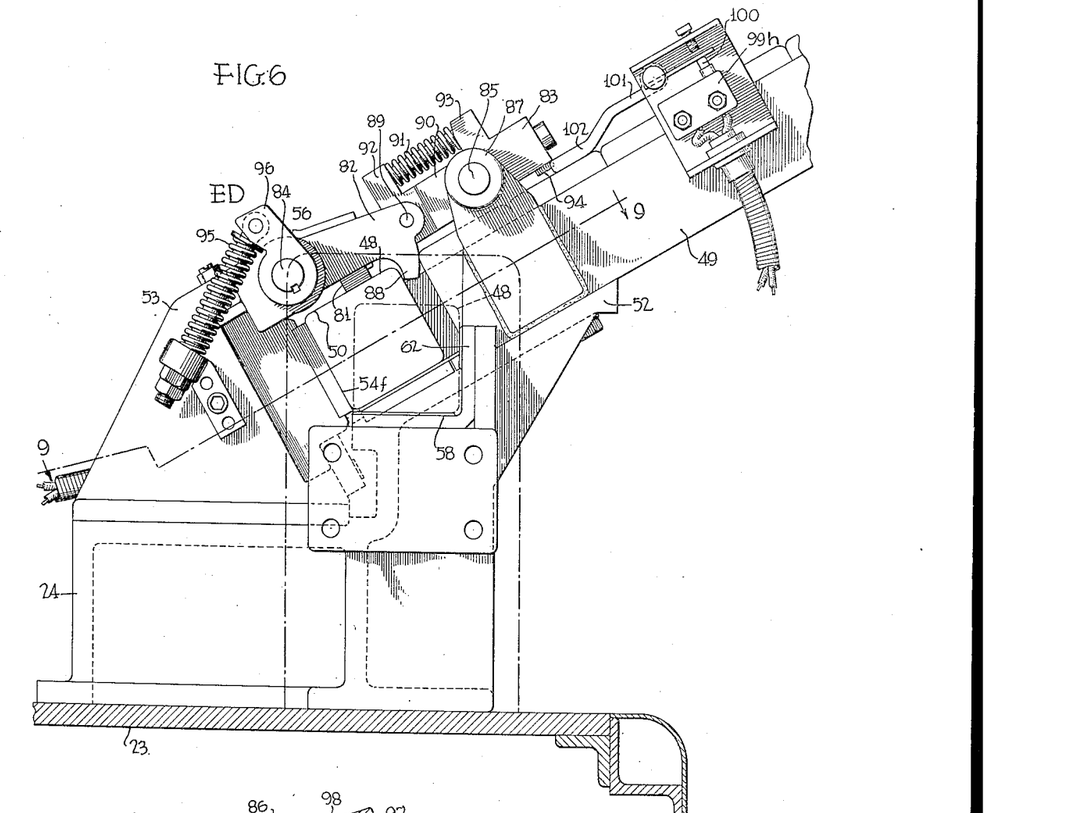
Figure 6 is a rear elevation of the principal portion of this mechanism taken approximately on the line 6—6 of Figure 5.

The chute 49 carries on its advance side a signal effecting circuit breaker 99h operated by an actuating pin 100 from a crank 101, the outer end 102 of which is borne by gravity upon the top face of the billets 48 being fed (see especially Figures 5 and 6). Whenever the supply of billets in the chute 49 is exhausted the end 102 is carried by gravity downward to effect an appropriate signal, the nature of which is such, for example, as to cause the circuit breaker 99h to cut the power from the machine until the chute is again supplied with billets.

Figure 12:
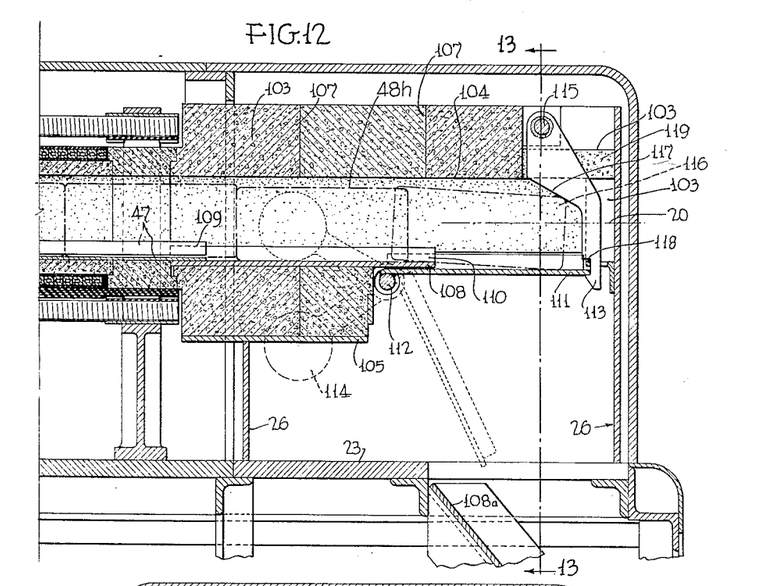
Figure 12 is an enlarged vertical longitudinal section of the billet discharge section at the rear of the machine.
Figure 13:
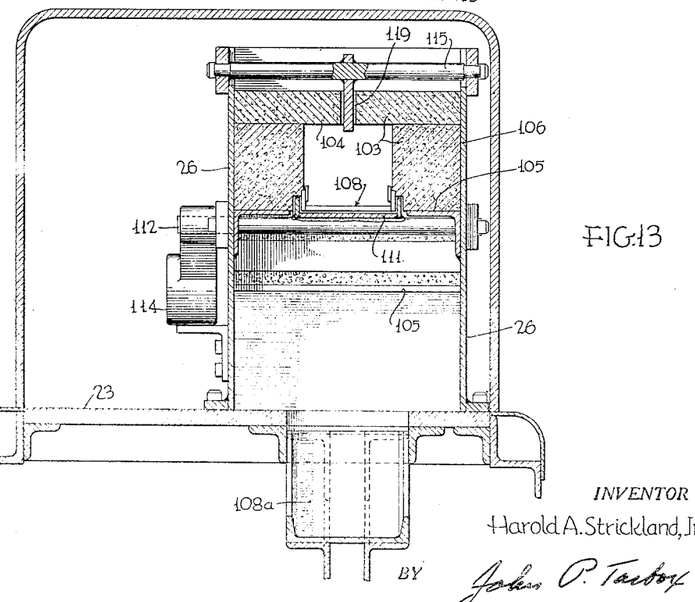
Figure 13 is an enlarged transverse section of this portion of the machine taken on line 13—13 of Figure 12 and Figure 4.

The delivery mechanism DL, at the end of the machine opposite the feeding mechanism ED, receives billets which have been inductively heated by the electromagnetic energy of the furnace unit NC. The showings of Figures 4, 12 and 13 apply especially to the understanding of this mechanism. Generally speaking, the delivery mechanism structure comprises a thick-walled housing 103 of fire-brick divided transversely into a number of sections for convenient installation and repair, the sections being ring-shaped like the rings 36 but considerably thicker and provided with an aperture 104 of the same dimension as the tunnel aperture 37 of the coil sections 27. They are arranged about the axis 20 to align the aperture 104 with tunnel aperture 37 to provide extensions thereof. The advanced section of walls 103 is interlocked at line 39 with the endmost ring 36 of the furnace unit NC. However, the walls 103 are independently supported by the bottom floor 105 of the mechanism DL and by the side walls 106 of the frame 26. Like the fire-brick division lines 31 of the walls 30 of the tunnel, the walls 103 are also divided into longitudinal sections along 107, this being of especial advantage at the delivery end. At the end adjoining the furnace unit NC, the rear ends of strips 47 give way to a storage trough 108 of a length suitable to receive and store a completely heated billet 48h. The trough 108 may be of material similar to the strips 47, durable under the application of heat. The trough 108 is entered under the projecting ends 109 of the strips 47 to enable it to receive a billet without obstruction, though at a slightly lower level. Entered below the advance end 110 of the trough 108 is a delivery gate 111, hinged on an horizontal axis 112 lying below the end 110 of trough 108. This gate is biased to an horizontal and closed portion where it is held normally by latch 113 by weight 114 connected with the gate 111 through its axis 112. The walls 103 are broken away below this gate so that this gate may freely swing downwardly to permit the billet to be dropped into the receiving chute 108a. Latch 113 is carried by a transverse pivot 115 a sufficient distance behind its engaging point 113 to permit the latch to be pushed to latching position by gravity, yet operated to unlatched position by the engaging advance edge 116 of each billet which may be pushed past the end 110 of the storage trough 108. A cam surface 117 is provided on latch 113 for engagement between edge 116 and a stop 118 prevents the latch from falling too far forwardly for effective or orderly engagement of the cam 117. The latch extends into the tunnel 37 through a slot 119 in the top and rear walls 103 (to be seen in Figures 12 and 13). Thus, the delivery mechanism automatically performs the following functions:

(a) Storage of a billet upon storage trough 108 and for at least one stroke of the plunger 54, thereby allowing time for the heat of the billet to so permeate the body of the billet as to heat it throughout to substantially the same temperature. By lengthening the trough 108 to the length of two billets or more, this so-called "soaking" time may be adjusted.

(b) The complete heat insulation of the billet during this "soaking" period, preventing the escape of the heat applied by the furnace unit NC until delivery. The delivery gate which is at the bottom remains closed, shutting off the billet from the outside atmosphere.

(c) The automatic delivery through the gate to the receiving trough 108a at the extreme forward stroke of the feeding plunger 54, this through the engagement of the advancing upper edge of the leading billet with operating cam surface 117 of the latch 113. Cam 117 exerts a downward pressure to break a billet loose should any sticking have occurred. Immediately the billet which dropped the gate 111 by its own weight, has left the machine, the gate automatically closes again. Accordingly, the "soaking" chamber of the delivery mechanism DL is protected against the atmosphere.

The coils 28 of the furnace unit NC are supplied with electrical energy and cooling water by an appropriate system of connections which appears at its best in Figures 1, 3, 10 and 11.

An outstanding feature of this system consists of the coils 28 of the units 27 forming a plurality of sub-sections 120 (note especially Figure 11) and the bringing of the ends 121 of these sections together to common water connections 122. Water is thus introduced through these common connections and discharged in parallel, the flow being alternately in opposite directions through these connections and consequently in opposite directions through the coil, as indicated by the arrows in opposite directions in Figure 11. The coil ends 121 are electrically connected together. The interior coil ends 121 are respectively connected by leaders 123 to bus bars 124 of opposite polarity, from which the coils 28 receive their power, while through such connections the respective coils 28 are connected in parallel. Obviously, other connection is feasible. The bus bars 124 are spaced apart by an insulating plate 125 and they, together with the plate, are bolted to the depending extensions 126 of pedestals 25. Cables 127 connect them to the power supply system and to the banks of condensers 128 (see Figure 3) housed within the base BA. Water connections 122 are supplied through leads 129 which extend through the top 23 to the interior of the base BA and they are fed (see Figure 3) from a series of individual flow switches 130, each adapted to give a signal in case of failure of water flow. These switches are connected in series through mechanism 131 so that variations of water flow in any individual coil section will operate a common signal. This signal may be such as to cut off the supply of power to the bus bars 124 and hence prevent the coils from being overheated and burned out. All of these flow switches 130 are provided with glass sights 132 through which the equal water flow can be observed, whereby any individual variations can be quickly spotted and whereby decreases in flow premonitory of failure can be discerned. Water connections 134 are provided for the discharge ends of the coils and these may open into a common discharge conduit 135.

Additional control devices, such as, for example, water pressure and temperature gauges for the heating coils and means for checking the temperature of the heated billets, may be incorporated into the control system, if desired, all of which may be hooked into the control system in such manner as to shut off the supply of current to the heating coils and the driving motor for the feed mechanism, in the event of abnormal conditions.

Timing relays and circuit-breakers are accorded a special compartment 133 toward the front of the base. The entire system of circuits, including the various, described signalling devices, the switch 80 signalling plunger pressure, the switch 99 signalling billet feed, the flow switches 130, the various electric relays, timing device, circuit-breakers and, of course, the coils 28 of furnace unit NC are secured in their proper interrelations.

While certain features of the present invention have been described in connection with a heating chamber it is to be understood that many features of the invention, particularly those having to do with the feed and delivery mechanisms are applicable to heating apparatus employing other means of deriving heat for heating the workpieces.

While only a single embodiment of the invention has been shown and described for the purpose of illustration, it is obvious that various changes may be made in the parts and organizations thereof without departing from the spirit and scope of the invention, as defined by the appended claims.

The parallel water and series electrical connections for the inducing convolutions is claimed in my copending application Ser. No. 411,579 filed September 19, 1941, for Heating coil.

What is claimed is:

1. An apparatus for heating workpieces comprising, in combination, an elongated, open-ended heating chamber capable of containing a plurality of workpieces in aligned end-to-end relation at one time, a heat retaining delivery chamber associated with one end of said heating chamber in closed relation for receiving heated workpieces therefrom and having a normally closed delivery port, latching means for holding said port in closed position, intermittently operable means for disposing a workpiece adjacent the opposite end of said heating chamber in aligned end-to-end engagement with the endmost workpiece at said opposite end and for propelling said workpieces through said heating chamber a sufficient distance to dispose one of the heated workpieces in said delivery chamber, said delivery chamber being of such length as to receive at least two of the workpieces whereby at the end of each propelling movement the endmost workpiece may actuate said port latch and discharge through said normally closed delivery port and the penultimate workpiece may remain in said delivery chamber pending the next succeeding propelling movement.

2. An apparatus for heating workpieces comprising, in combination, an elongated, open-ended heating chamber capable of containing a plurality of the workpieces in aligned end-to-end relation at one time, a heat retaining delivery chamber associated with one end of said heating chamber in closed relation for successively receiving heated workpieces from said heating chamber, said delivery chamber having a discharge port and a delivery gate normally closing said port, latching means for holding said gate closed, and intermittently operable means for successively positioning workpieces at the opposite end of said heating chamber and propelling the end-to-end engaged workpieces a pre-determined distance through said heating chamber, the latching means of said delivery gate being operable to discharge a heated workpiece through said discharge port only substantially upon the completion of a propelling movement of the workpieces.

3. An apparatus for heating workpieces comprising, in combination, an elongated, open-ended heating chamber capable of containing a plurality of the workpieces in aligned end-to-end relation at one time, a heat retaining delivery chamber associated with one end of said heating chamber in closed relation for successively receiving heated workpieces from said heating chamber, said delivery chamber having a discharge port, a delivery gate normally closing said port and a latch member holding said gate in normally closed position, and intermittently operable means for successively positioning workpieces at the opposite end of said heating chamber and propelling the end-to-end engaged workpieces forwardly through said heating chamber a distance equal to the length of one of the workpieces, said delivery gate being operable to discharge a heated workpiece through said port only substantially upon the completion of a propelling movement of the workpieces and then only upon engagement of the endmost heated workpiece with said latch to release said gate.

4. In an induction heating apparatus having an elongated heating chamber for containing a plurality of workpieces in aligned end-to-end relation at one time, induction heating elements associated with said chamber and a source of current supply for said elements, means for successively positioning unheated workpieces in position for end engagement with a preceding workpiece for subsequent propulsion through said heating chamber, propulsion means engageable with the last positioned workpiece for propelling the end-to-end engaged workpieces, actuating means connected to said propulsion means, a yieldable member between said propulsion and actuating means, a source of power for said last-named means, and means associated with said actuating means operable to shut off said source of power at pressures in excess of a pre-determined propulsion pressure without disconnection of said actuating means, yieldable member and propulsion means.

5. In an induction heating apparatus having an elongated heating chamber for containing a plurality of workpieces in aligned end-to-end relation at one time, induction heating elements associated with said chamber and a source of current supply for said elements, means for successively positioning unheated workpieces in position for end engagement with a preceding workpiece for subsequent propulsion through said heating chamber, propulsion means engageable with the last positioned workpiece for propelling the end-to-end engaged workpieces, actuating means connected to said propulsion means, a yieldable member between said propulsion and actuating means a source of power for said last-named means, and means associated with said actuating means operable to shut off said source of power at pressures in excess of a pre-determined propulsion pressure and also to prevent the supply of current to said heating elements, without disconnection of said actuating means, yieldable member and propulsion means.

6. In a billet heating machine having a heating chamber, a yieldable pusher member for successively engaging and propelling unheated billets to said chamber, means connected to said pusher member for actuating said pusher member, a source of power for said actuating means, and means responsive to a pre-determined propelling pressure of said pusher member for disconnecting said actuating means from said source of power without breaking the connection between the actuating means and pusher member.

7. In a billet heating machine having a heating chamber, a pusher member for successively propelling unheated billets to said chamber, means for actuating said member, a source of power for said acuating means, said member having a main part connected with said actuting means, a secondary billet engaging part and resilient means between said parts, and means responsive to a pre-determined compression of said resilient means during propulsion movement of said member to disconnect said actuating means from its said source of power.

8. In a billet heating machine having an elongated heating chamber for containing a plurality of billets in end-to-end engagement, means for propelling successive unheated billets into engagement with a preceding billet and thence for a predetermined distance of travel relative to said chamber, inclined chute means capable of containing a number of unheated billets, and means operable positively at a predetermined position of travel of said propelling means to release a billet from said chute means for gravity disposition between said propelling means and the last propelled billet, and operable yieldingly and simultaneously to prevent downward movement of the next succeeding and superior billet in said chute means.

9. In a heating apparatus having an elongated heating chamber through which a chain of workpieces in end-to-end relation are to be propelled, said chamber having an open discharge end, a heat-retaining delivery chamber associated with said discharge end and forming a continuation of said heating chamber to receive heated workpieces therefrom, and a delivery gate for said delivery chamber remotely positioned with respect to said discharge end and normally closing said delivery chamber, said delivery chamber being of such length as to receive at least two of the heated workpieces whereby to provide a "soaking" station intermediate said discharge end and gate and a delivery station, said delivery chamber being provided with a latch means normally holding said gate in closed position and being releasable to permit said gate to open by engagement therewith of a billet reaching said delivery station.

10. In a heating apparatus having an elongated heating chamber through which a chain of workpieces in end-to-end relation are to be propelled, said chamber having an open discharge end, a heat-retaining delivery chamber associated with said discharge end and forming a continuation of said heating chamber to receive heated workpieces therefrom, said delivery chamber having a "soaking" station adjacent said discharge end and a delivery station remote from said discharge end, said delivery station embodying a discharge outlet in the bottom of said delivery chamber and a gate normally closing said outlet, said "soaking" station and said gate each being of sufficient size to receive a heated workpiece, and releasable means normally holding said gate in closed position and being releasable by engagement therewith of a workpiece reaching said delivery station, whereby the weight of the workpiece on said gate causes said gate to open and discharge such workpiece therefrom by gravity.

11. An apparatus for heating workpieces comprising, in combination, an elongated heating chamber through which a chain of workpieces in end-to-end relation are to be intermittently propelled, said chamber having an open feed end, a loading platform adjacent said feed end for properly supporting the endmost workpiece of the chain in position for movement into said chamber, a gravity feed chute extending laterally from the longitudinal axis of the chain of workpieces and being inclined relative to the workpiece-supporting surface of said platform, said chute having its discharge end terminating in advance of said platform, and a reciprocable pusher member having a longitudinal workpiece-engaging portion which engages the leading side of a workpiece supported on said discharge end of said chute and a transverse portion engageable with an end of the workpiece so supported for propelling such workpiece into end engagement with the endmost workpiece of the chain and for propelling said workpieces a pre-determined distance through the heating chamber sufficient to position the workpiece engaged thereby over said platform, said pusher member being so constructed that upon termination of its propelling movement the workpiece engaged thereby will drop into loading position on said platform.

12. In a billet heating machine having an elongated heating chamber for containing a plurality of billets in end-to-end engagement, means for propelling successive unheated billets into engagement with a preceding billet and thence for a predetermined distance of travel relative to said chamber, inclined chute means capable of containing a number of unheated billets, and means operable positively at a predetermined position of travel of said propelling means to release a billet from said chute means for gravity disposition between said propelling means and the last propelled billet, and operable yieldingly to prevent downward movement of the next succeeding and superior billet in said chute means, and means for de-energizing said propelling means on cessation of supply of billets in said chute.

HAROLD A. STRICKLAND, Jr.